(12) United States Patent
Nakajima et al.

(10) Patent No.: US 6,579,486 B1
(45) Date of Patent: Jun. 17, 2003

(54) MANUFACTURING METHOD FOR FLANGED RESIN PRODUCT

(75) Inventors: Shigeru Nakajima, Kanagawa-ken (JP); Sachio Takizawa, Kanagawa-ken (JP); Takuji Akiyama, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 44 days.

(21) Appl. No.: 09/706,719

(22) Filed: Nov. 7, 2000

(30) Foreign Application Priority Data

Nov. 9, 1999 (JP) ............................. 11-318639

(51) Int. Cl.[7] .......................... B29C 45/20; B29C 57/00
(52) U.S. Cl. ................. 264/255; 264/328.9; 264/328.12
(58) Field of Search ................................ 264/255, 248, 264/249, 261, 263, 271.1, 328.9, 328.12, 259

(56) References Cited

U.S. PATENT DOCUMENTS

| | | | | |
|---|---|---|---|---|
| 3,831,566 A | * | 8/1974 | Thomas ................. | 123/184.33 |
| 4,301,775 A | * | 11/1981 | Smart et al. ........... | 123/184.61 |
| 5,243,933 A | * | 9/1993 | Mukawa ................. | 264/259 |
| 5,245,955 A | * | 9/1993 | Husted .................. | 264/271.1 |
| 6,021,753 A | * | 2/2000 | Chaffin et al. ......... | 123/184.21 |
| 6,117,380 A | * | 9/2000 | Shirai et al. .......... | 264/255 |
| 6,267,093 B1 | * | 7/2001 | Lohr ..................... | 264/328.2 |

FOREIGN PATENT DOCUMENTS

| | | |
|---|---|---|
| EP | 0913241 A1 | 5/1999 |
| FR | 2690376 | 10/1993 |
| JP | 03230924 | 10/1991 |
| JP | 07205299 | 8/1995 |

OTHER PUBLICATIONS

European Search Report dated Feb. 28, 2001.

* cited by examiner

Primary Examiner—Mark Eashoo
Assistant Examiner—Geoffrey P. Shipsides
(74) Attorney, Agent, or Firm—McDermott, Will & Emery

(57) ABSTRACT

A manufacturing method for a resin product comprised of a plurality of separate pieces and having a flange, the plurality of separate pieces including one as a separate piece having a flange corresponding to the flange of the resin product, comprises primary-injection-molding the plurality of separate pieces including the separate piece having the flange by a primary injection of a resin, and having respective separate planes of the plurality of separate pieces in abutment, joining the separate pieces together to mold the resin product having the flange by a secondary injection of a welding resin. When molding the plurality of separate pieces including the separate piece having the flange by the primary injection of the resin, a gate part for molding the flange of the separate piece having the flange is positioned inside the flange.

11 Claims, 5 Drawing Sheets

MANUFACTURING METHOD FOR FLANGED RESIN PRODUCT

BACKGROUND OF THE INVENTION

The present invention relates to a manufacturing method for flanged resin products and a flanged resin product, and particularly, to a manufacturing method for flanged resin products in which, after a plurality of separate pieces including a flanged separate piece are molded by a primary injection of a resin, the plurality of separate pieces are joined together to mold a resin product by a secondary projection of a welding resin, and to a flanged resin product formed by the same.

As a manufacturing method for resin products, there is known an injection welding method in which separate pieces, or the like, obtained by a blow molding, or injection molding, are covered and joined by a molten resin.

As such an injection welding method, there is proposed a so-called DSI (die slide injection) method, or DRI (die rotary injection) method.

In the DSI method, in general, after a set of primary mold products are obtained by an injection molding using a set of dies, one die is moved relative to the other to bring end faces of the set of primary mold products into abutment, and a molten resin is injected in a periphery of the abutting parts, joining them both together to manufacture the set of primary mold products as a complete article.

In the DRI method, in general, a set of relatively rotatable dies are used, and per every rotary action, obtaining a set of primary mold products by an injection molding, end faces of the set of primary mold products are brought into abutment, and a molten resin is injected on a periphery of the abutting parts, joining them both together and thus, manufacturing the set of primary mold products as a complete article.

On the other band, most resin products are provided with flanges such as joints, with opponent parts to be molded.

SUMMARY OF THE INVENTION

A study by the present inventors however shows that, in the case a resin product is provided with a flange as above, it is preferable to provide in a die a gate for injecting a molten resin to mold the flange.

For example, an intake manifold, which is made of resin, of an automobile engine is now examined as a flanged resin product. In a case where such a resin made intake manifold is molded by an injection welding molding method, or more specifically, in a case where a plurality of separate pieces, including a flanged separate piece, are simultaneously molded in a primary injection molding phase, there can be assumed an arrangement in which a gate for molding the flanged separate piece is laterally provided to a periphery of a flange.

For such a case, an additional study by the present applicants shows that molten resin has a reduced tendency to flow opposite the gate, with a resultant limit to molding precision; for example, a flange dimension.

In particular, such a flange generally constitutes a joint with an opponent part, such as a surge tank, and requires the joint to have a necessary flatness, or area, to be sufficiently and accurately secured as a base. In addition, fine configurations, such as an O-ring fitting groove to be simultaneously formed along the flange to provide a secure sealing, are required to be well secured with a sufficient precision.

The present invention is made on the basis of such studies, and it is an object of the invention to provide a manufacturing method for a resin product having a flange, and a resin product having a flange, allowing for a flanged separate piece to be molded, without reduction in accuracy of flange dimension, in a primary injection molding phase.

Accordingly, there is provided an manufacturing method for a resin product having a flange an in particular, a manufacturing method for a resin product comprised of a plurality of separate pieces and having a flange. The plurality of separate pieces include one, as a separate piece, having a flange corresponding to the flange of the resin product, and the plurality of separate pieces, including the separate piece having the flange, are primary-injection-molded by a primary injection of a resin, and respective separate planes of the plurality of separate pieces are in abutment, joining the separate pieces together. The resin product having the flange is molded by a secondary injection of a welding resin. When molding the plurality of separate pieces, including the separate piece having the flange, by the primary injection of the resin, a gate part, to which molding material is injected for molding the flange of the separate piece having the flange, is positioned inside the flange to be part of the flange.

Additionally, a resin product having a flange, according to the invention, is molded by this method.

DETAILED DESCRIPTION OF THE PREFERRED EMBODIMENTS

There will be detailed below respective embodiments of a manufacturing method for flanged resin products and a flanged resin product according to the present invention, with adequate reference to the drawings. There are described, in each embodiment below, a DSI method, as an example of the manufacturing method, and a resin made intake manifold of an automobile engine, as an example of the flanged resin product.

First, description is made of a manufacturing method for flanged resin products and a flanged resin product according to the first embodiment of the invention, with reference to FIG. 1 to FIG. 5B.

Figure 1:
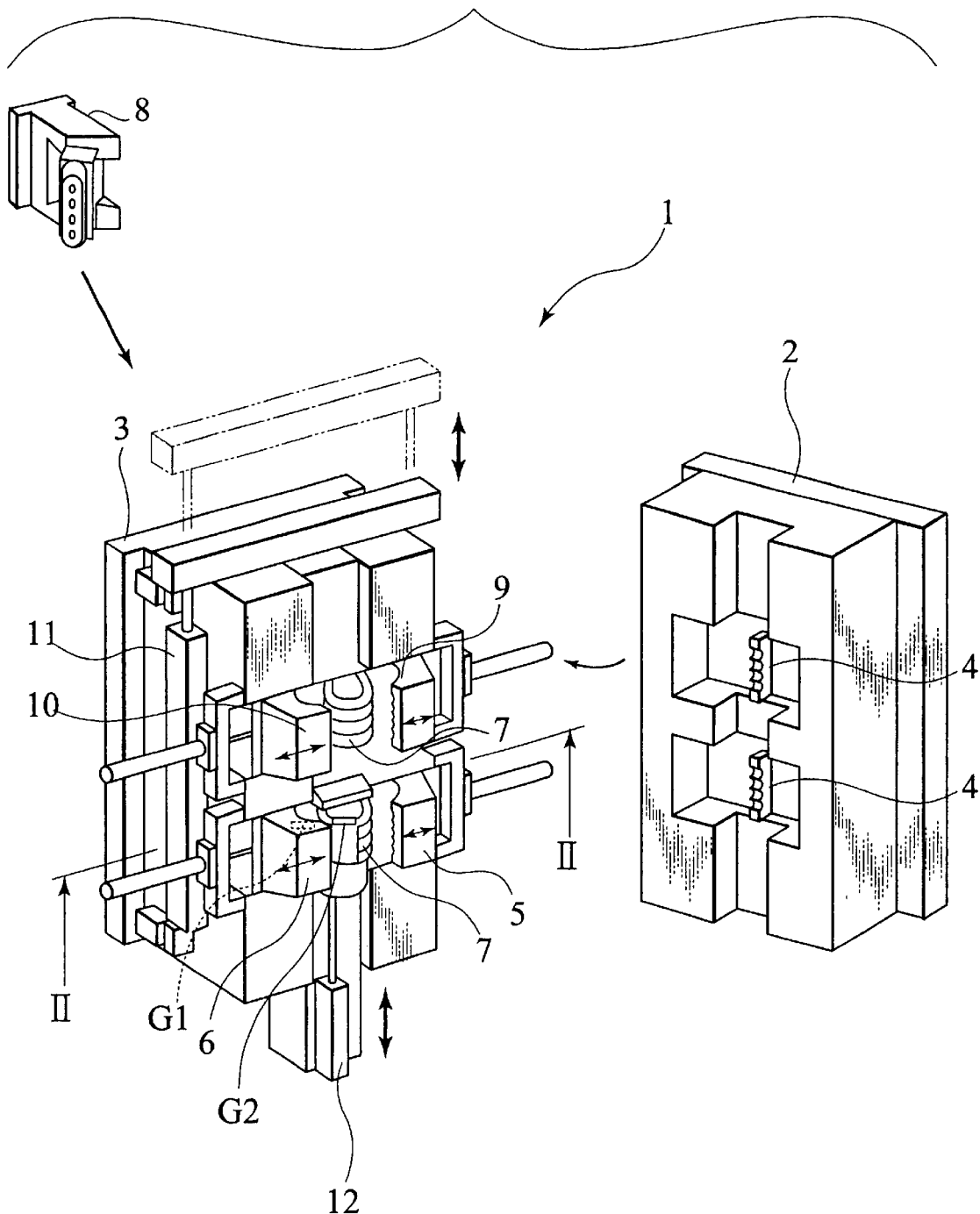
FIG. 1 is an illustrative perspective view of a die device, in an open state, to be used in a manufacturing method for flanged resin products in a first embodiment of the present invention.
Figure 2:
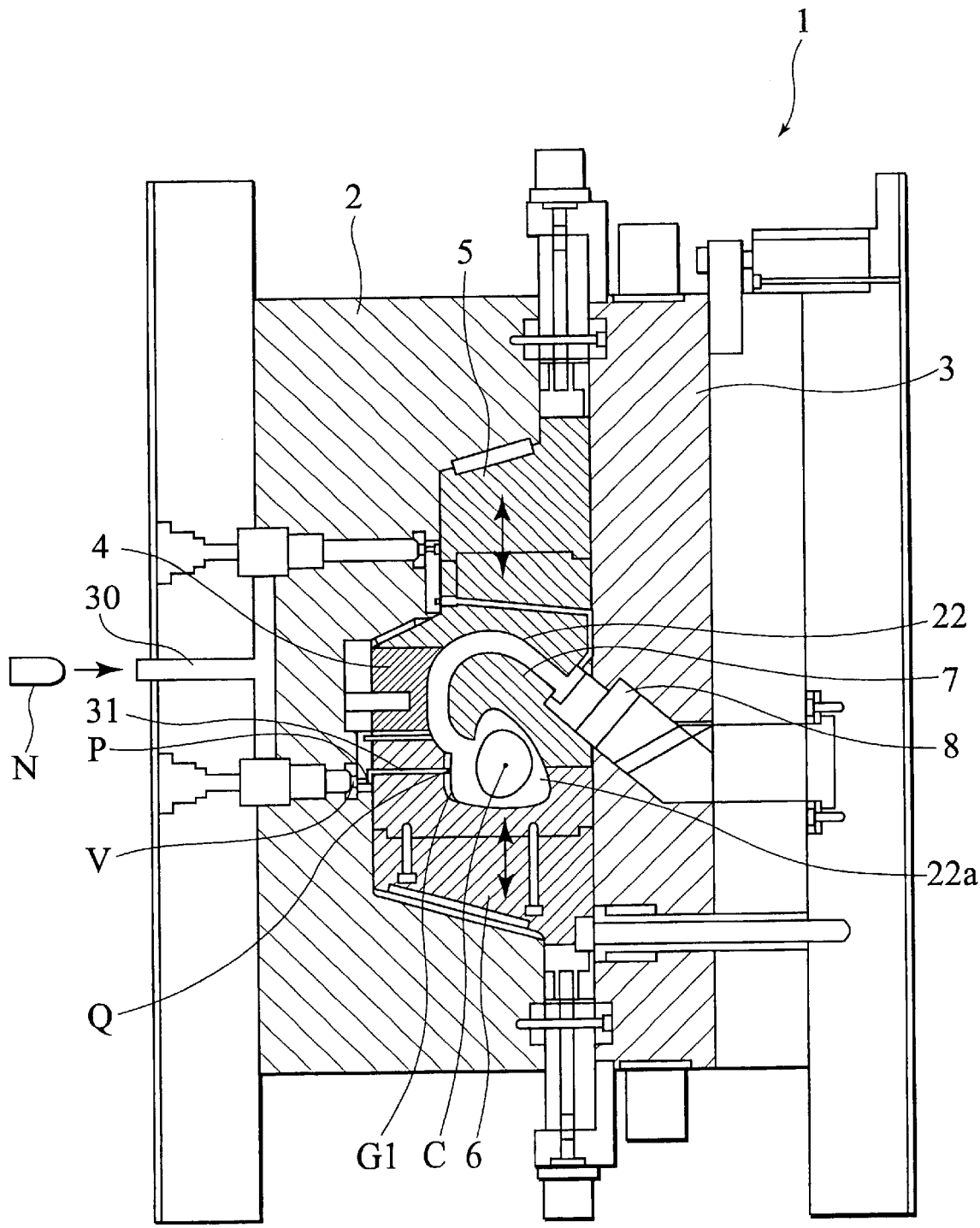
FIG. 2 is a sectional view of the die device, in a closed state, corresponding to a II—II section of FIG. 1, as it is rotated counterclockwise at 90° on the figure for convenient illustration according to the embodiment.
Figure 3:
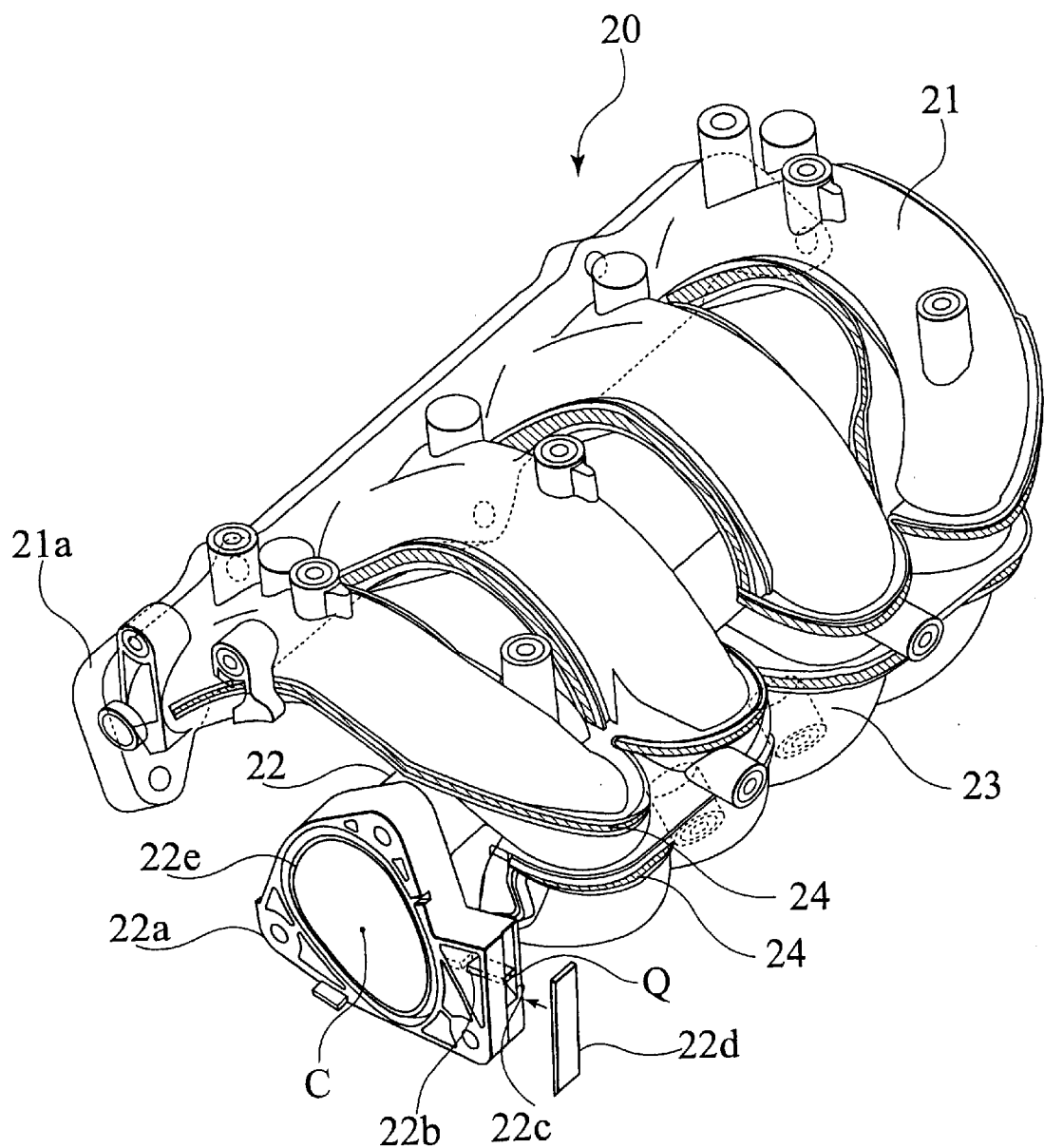
FIG. 3 is a perspective view of a resin made intake manifold to be molded by the manufacturing method for flanged resin products according to the embodiment.
Figure 4:
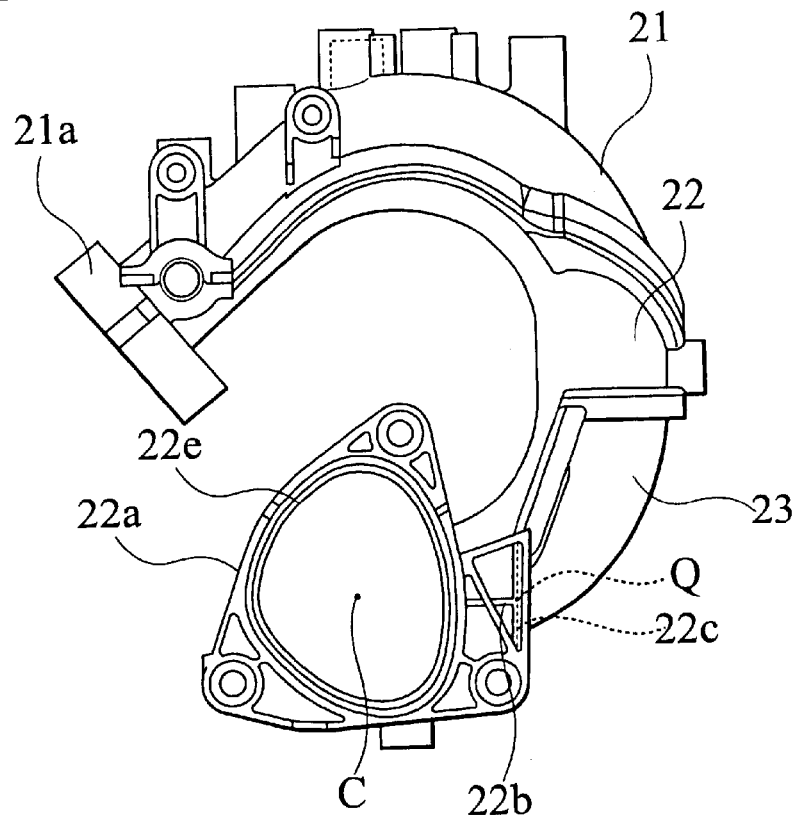
FIG. 4 is a side view of the resin made intake manifold according to the embodiment.

As shown in FIG. 1 and FIG. 2, a die device 1 is provided with a fixing plate 2 at a stationary end, and a fixing plate 3 at a mobile end, configured to be moved near and spaced apart relative to the stationary end fixing plate 2. On the stationary end fixing plate 2 there is furnished a stationary die 4, and on the mobile end fixing plate 3, there is furnished mobile dies 5 to 10.

Mobile dies 5, 6, 9 and 10 are movable on the mobile end fixing plate 3, leftward and rightward in FIG. 1 (vertically in FIG. 2), by cylinders (not shown). Mobile dies 7 are movable on the mobile end fixing plate 3, vertically in FIG. 1 (normal to FIG. 2), by cylinders 11 and 12.

As shown in FIG. 3 to FIG. 5B, a resin made intake manifold 20 is separated into three pieces 21, 22 and 23. The separate piece 21 has a cylinder head flange 21a. The separate piece 22 has a surge tank flange 22a to be noted in this embodiment. The surge tank flange 22a of the separate piece 22 is formed with a gate part 22b extending rib-like from outline of the surge tank flange 22a, toward a center C thereof, and a cutout part 22c configured for adequate provision of the gate part 22b, the cutout part 22c being blocked with a block part 22d of a flat plate form. The surge tank flange 22a has an O-ring fitting groove 22e for an O-ring to secure adequate gas-tightness at a surge tank (not shown) to which the resin made intake manifold 20 joins.

In a primary injection molding phase of the three separate pieces 21, 22 and 23 constituting the resin made intake manifold 20, there are molded the separate piece 21 with the cylinder head flange 21a by using the dies 4, 7 and 9, the separate piece 22 with the surge tank flange 22a by using the dies 4, 5, 6, 7 and 8, and the separate piece 23 by using the dies 4, 7 and 10. In other words, the separate piece 21 is molded mainly in correspondence to right-located assemblage of an upper the of the die assembly 1 in FIG. 1, the separate piece 22 is molded mainly in correspondence to left-located assemblage of the upper die, and the separate piece 23 is molded mainly in correspondence to assemblage of a lower die.

Molten resin, as the material to mold the resin made intake manifold 20, that is, the three separate pieces 21, 22 and 23, is supplied from a nozzle N, through a path 30, to valves V, and when the valves V are opened, runs along runners 31, entering a gate forming part G1 provided in the die 6, another gate forming part G2 provided as a corresponding one in the die 7, and the like. Gate forming parts, such as G1 and G2, are cooperative to form the gate part 22b of the surge tank flange 22a.

Note that the resin employed in this embodiment is used in the primary injection molding and in a secondary injection molding, and is unchanged in between. More specifically, it is a thermoplastic polyamide resin containing glass fibers.

Figure 5A:
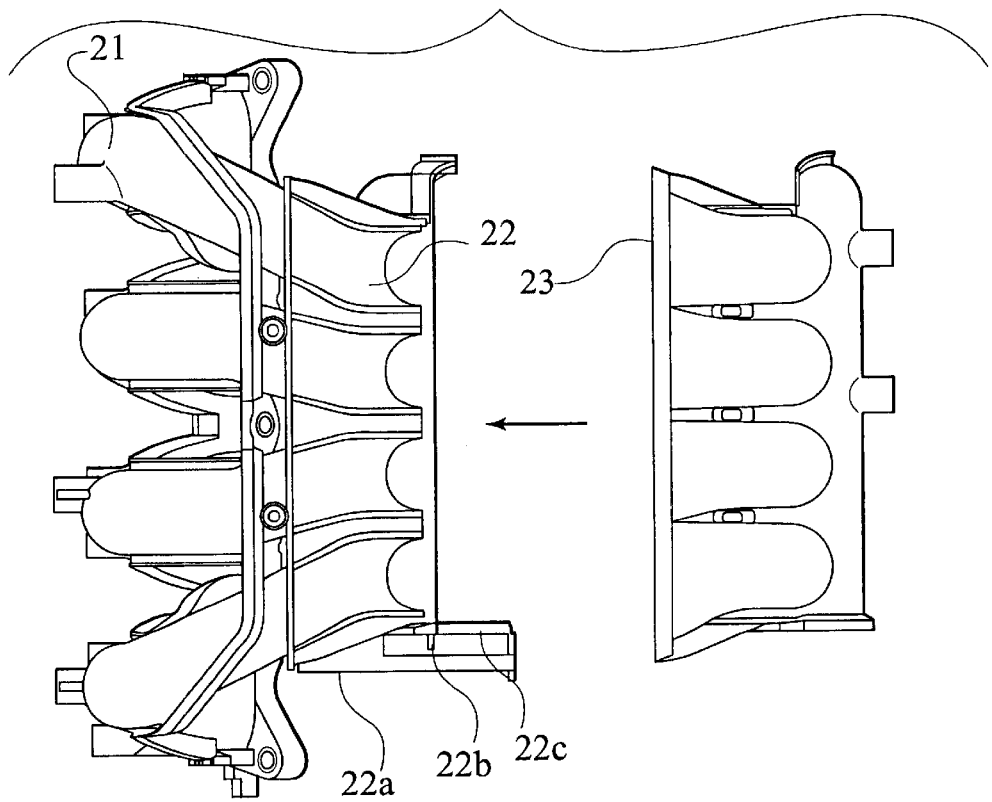
FIG. 5A is a process illustrative view showing a partially joined state of the resin made intake manifold in the manufacturing method for flanged resin products according to the embodiment, and FIG. 5B, a process illustrative view showing an entirely joined state of the resin made intake manifold in the manufacturing method for flanged resin products according to the embodiment.

To mold the resin made intake manifold 20 in the die device 1 with the arrangement described, first, the mobile end fixing plate 3, with the mobile dies 5 to 10 set in position thereon, is closed to the stationary end fixing plate 2, and resin is shot for the primary injection to mold the three separate pieces 21, 22 and 23. FIG. 5A shows separate pieces 21, 22 and 23 thus obtained, with the separate pieces 21 and 22 having been assembled.

The separate piece 22 thus mold, is provided with the cutout part 22c at periphery of outline of the surge tank flange 22a, which is for the gate part 22b to extend from the outline of the surge tank flange 22a toward the center C, when molding the surge tank flange 22a of the separate 22.

Next, the mobile end fixing plate 3 is opened from the stationary end fixing plate 2, and thereafter, the mobile dies 5, 6, 9 and 10 are opened by the unshown cylinders. Then, leaving in place the separate piece 22 with the surge tank flange 22a, the mobile dies 7 and 8 are slid by the cylinder 11, so the mobiles dies 7 to 10 are arranged to make abutment between respective separate planes of the separate pieces 21, 22 and 23, before closing the mobile dies 5, 6, 9 and 10.

Figure 5B:
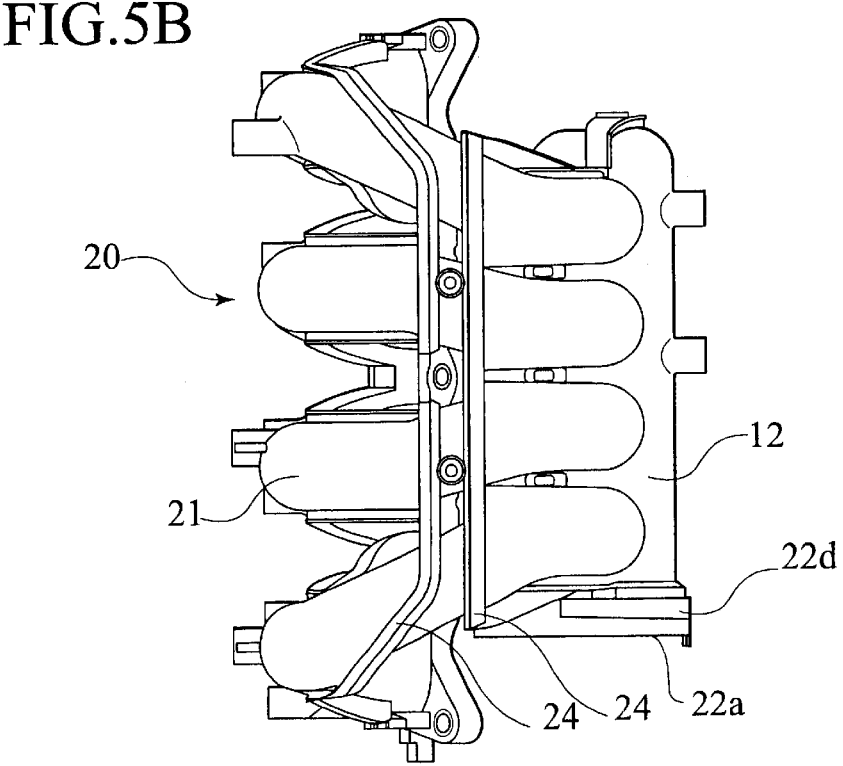

Then, the mobile end fixing plate 3 is closed again to the stationary end fixing plate 2, and the separate pieces 21, 22 and 23 are welded together by a secondary injection of a welding resin to respective abutting parts 24 of the separate pieces 21, 22 and 23, as shown in FIG. 5B. Concurrently therewith, for filling the cutout part 22c at the periphery of the surge tank flange 22a of the separate piece 22, the block part 22d is molded, thereby blocking the cutout part 22c, when the secondary injection is finished.

Thus, a molding of the resin made intake manifold 20 is completed.

Finally, after the secondary injection, the mobile dies 7 are slid by the cylinder 12, and the mobile dies 9 and 10 are opened to permit a removal of the resin made intake manifold 20.

Note that unnecessary resin in each runner 31, after completion of the primary injection, is cut at a point P in the die device 1 when the fixing plate 3 at the mobile end is opened from the fixing plate 2 at the stationary end, and is cut at a point Q in the die device 1 when the mobile dies 5 and 6 are opened, and the resin after the cutting is automatically removed by a remover (not shown).

After completion of the secondary injection also, unnecessary resin for the secondary injection molding is automatically cut and removed.

The runner 31 is set in design, with considerations such as to an automatic cutting of such unnecessary resin.

In this embodiment, in the primary injection molding phase, as the separate piece 22 is molded with the cutout part 22c at periphery of outline of the surge tank flange 22a so that the gate part 22b for molding the surge tank flange 22a of the separate piece 22 extends from the outline of the surge tank flange 22a toward the center C, molten resin tends to run well for distribution substantially over an entire region covering regions such as an opposite region, to the gate part 22b of the surge tank flange 22a. Therefore, the surge tank flange 22a has a very well dimensional accuracy in its entirety, including the O-ring fitting groove 22e to be concurrently molded along the surge tank flange 22a.

It is assumed that the gate part 22b of the surge tank flange 22a is located inside the outline of the surge tank flange 22a. Preferably, for better accuracy, the gate part 22b should extend toward the center C of its configuration.

Further, concurrently with a welding made between the separate pieces 21 to 23 by the secondary injection, there is molded the block part 22d for filling the cutout part 22c at the periphery of the surge tank flange 22a of the separate piece 22. It therefore is possible, in a secondary injection molding phase, to effectively compensate for a reduction in rigidity that may well be caused in the surge tank flange 22a by the provision of the cutout part 22c in the primary injection molding phase. As a result, the surge tank flange 22a is allowed to have, not simply a high dimensional precision, but also a high rigidity, both at a practical level.

Therefore, according to the embodiment, complicated three dimensional configurations can be accurately reproduced, and the manufacturing of a resin product to be achieved with a high mechanical property can be made in a facilitated manner, implementing a manufacturing method with secured flexibility in design of resin product, as well as high performance, effectively controlling costs as well as weight.

Next, description is made of a manufacturing method for flanged resin products and a flanged resin product according to the second embodiment of the present invention.

Figure 6:
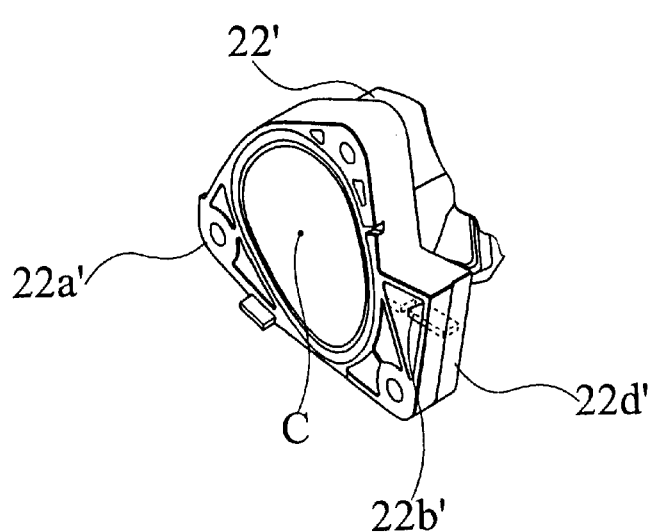
FIG. 6 is a fragmentary perspective view of a resin made intake manifold to be molded by a manufacturing method for flanged resin products in a second embodiment of the invention.

As shown in FIG. 6, this embodiment is different from the first embodiment simply in a molding procedure of a surge tank flange 22a' of a separate piece 22', and like components to the first embodiment are designated by like reference characters, with their description brief or omitted, as necessary.

More specifically, different from the first embodiment in which, in the secondary injection molding, the separate pieces 21 to 23 are welded together and concurrently there is molded the block part 22d for filling the cutout part 22c in the periphery of the surge tank flange 22a of the separate piece 22, the second embodiment has a primary injection molding by which a block part 22d', for filling a gate part 22b' in a periphery of the surge tank flange 22a' of the separate piece 22', is molded concurrently with a molding of the gate part 22b'.

This is in consideration to a probable case in which, supposing a block part 22d to be molded in a secondary injection molding phase like the first embodiment, molten resin may deprive dies of heat, with resultant effects; e.g. on a welding nature among separate pieces 21, 22 and 23.

In other words, in this embodiment, the block part 22d' also is molded in the primary injection molding phase, thereby allowing for the block part 22d' to work as a kind of thermal insulation layer, preventing excessive decrease in die temperature.

To mold a resin made intake manifold 20 in the arrangement described, first, like the first embodiment, a mobile end fixing plate with respective mobile dies set in position thereon is closed to a stationary end fixing plate, and resin is shot for the primary injection to mold three separate pieces 21, 22' and 23.

At this time, the gate part 22b', for molding the surge tank flange 22a' of the separate piece 22', is extended from an outline of the surge tank flange 22a' toward a center C, and the block part 22d' is provided in a periphery of the outline of he surge tank flange 22a', whereby the separate piece 22' is molded.

Next, like the first embodiment, respective separate planes of the separate pieces 21, 22' and 23 are brought into abutment, and the separate pieces 21, 22' and 23 are welded together by a secondary injection of a welding resin to respective abutting parts 24 of the separate pieces 21, 22' and 23.

In this embodiment, the molding of the block part 22d of the separate piece 22 performed in the first embodiment is omitted, as it has been finished in the primary injection molding phase.

Thus, a molding of the resin made intake manifold 20 is completed.

In this embodiment, in the primary injection molding phase, the gate part 22b', for molding the surge tank flange 22a' of the separate piece 22', is extended from the outline of the surge tank flange 22a' toward the center C, and the block part 22d' is formed in the periphery of the outline of he surge tank flange 22a', thereby permitting a molding of the surge tank flange 22a' with high dimensional precision and high rigidity, as well as an increased welding strength of the three separate pieces 21, 22' and 23, thus allowing implementation of the resin made intake manifold 20 with high precision, high rigidity and high welding strength.

Although, in each of the foregoing embodiments, description is made of a resin made intake manifold of an automobile engine as an example of a flanged resin product, it is not limited thereto as a matter of course, and may well be applied to other combinations of separate pieces, as well as to other vehicular parts or parts of domestic electrical products and the like.

Moreover, in each of the embodiments, a DSI method is exemplified to be described, while the invention is applicable also to a DRI method, or other injection welding molding methods, as necessary.

Further, in the embodiments described, the same resin is used in a primary injection molding and a secondary injection molding. It, however, is possible to use different kinds of resins, as necessary, such as for a property of the product.

The entire contents of a Patent Application No. TOKUGANHEI 11-318639 with a filing date of Nov. 9, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A manufacturing method for a resin product comprised of a plurality of separate pieces and having a flange, the plurality of separate pieces including one as a separate piece having a flange corresponding to the flange of the resin product, comprising:

primary-injection-molding the plurality of separate pieces, including the separate piece having the flange, by a primary injection of a resin; and having respective separate planes of the plurality of separate pieces in abutment, joining the separate pieces together to mold the resin product having the flange by a secondary injection of a welding resin, wherein when molding the plurality of separate pieces, including the separate piece having the flange, by primary injection of the resin, a gate part, to which molding material is injected to mold the flange of the separate piece having the flange, is positioned inside the flange to be part of the flange.

2. A manufacturing method according to claim 1, wherein the gate part is extended rib-like toward a center of the flange.

3. A manufacturing method according to claim 1, wherein for the gate part to be positioned inside the flange, a cutout part is provided in a periphery of the flange.

4. A manufacturing method according to claim 3, wherein the periphery of the flange is provided with a block part closing the cutout part.

5. A manufacturing method according to claim 4, wherein the block part is formed when the welding resin is injected by the secondary injection.

6. A manufacturing method according to claim 1, wherein a part corresponding to the gate part in a periphery of the flange is closed by a block part.

7. A manufacturing method according to claim 6, wherein the block part is formed when the resin is injected by the primary injection.

8. A manufacturing method according to claim 1, wherein the resin and the welding resin are identical in kind.

9. A manufacturing method according to claim 1, wherein the resin product having the flange is an intake manifold of a three piece structure.

10. A manufacturing method according to claim 1, wherein a DSI method is executed.

11. A manufacturing method according to claim 1, wherein the resin product having the flange is an intake manifold.

* * * * *